A. SHADLOFSKI.
AUTOMATIC MOTOR VEHICLE BRAKE.
APPLICATION FILED APR. 15, 1912.
1,040,244.
Patented Oct. 1, 1912.
4 SHEETS—SHEET 3.
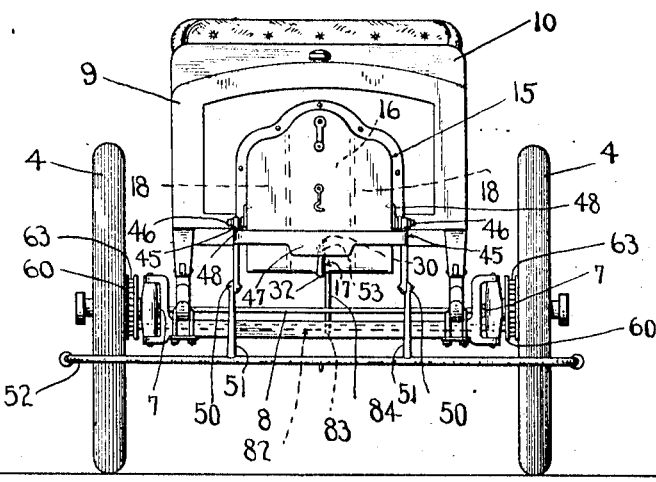
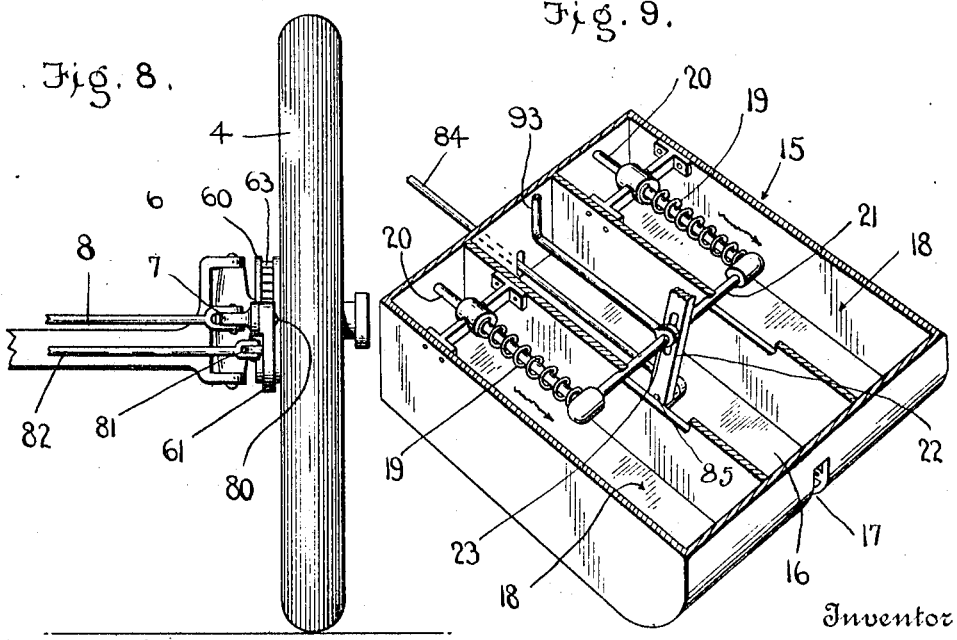
Witnesses
L. B. James
N. L. Collamer
Inventor
Anthony Shadlofski
by H. B. Willson & Co.
Attorneys

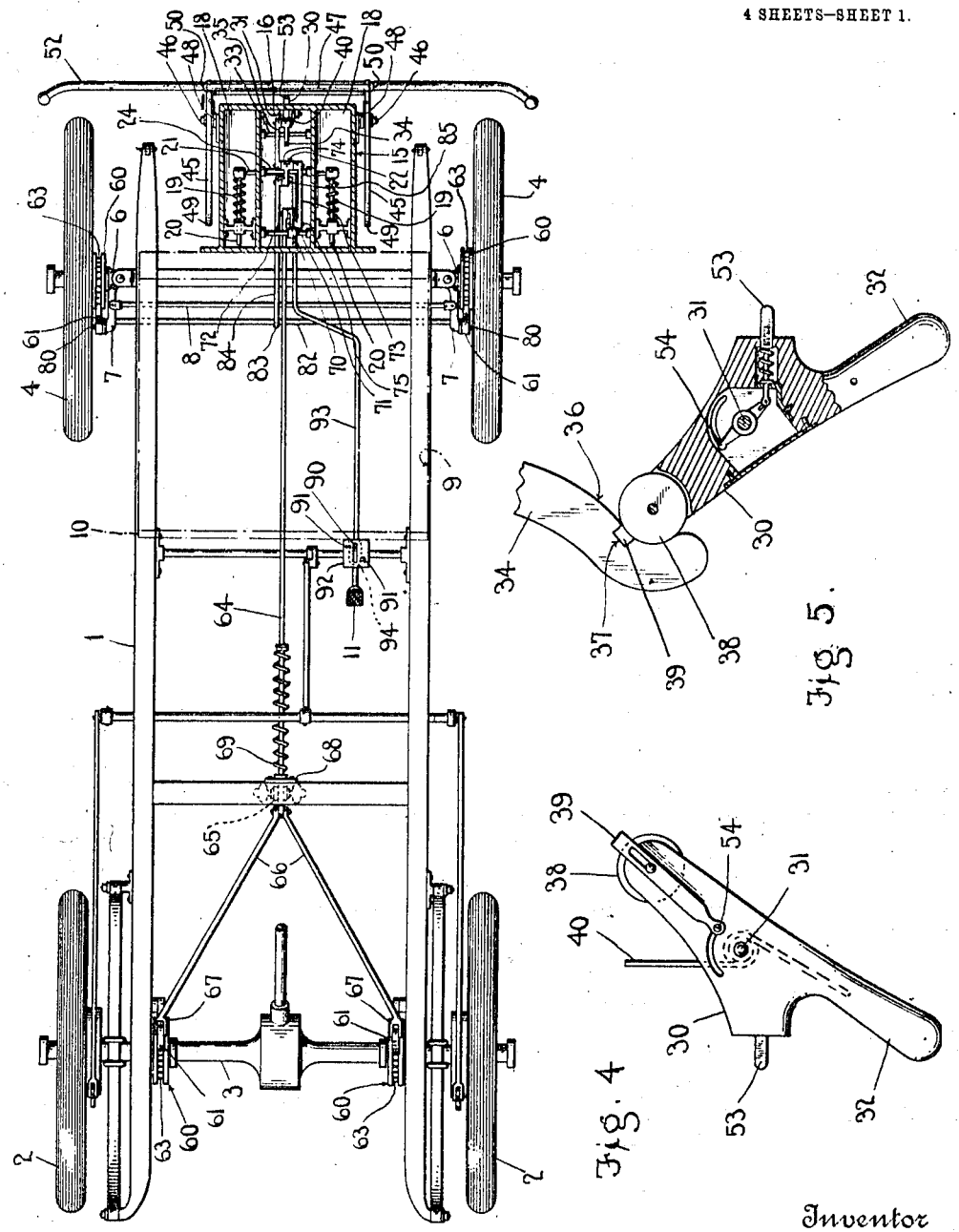

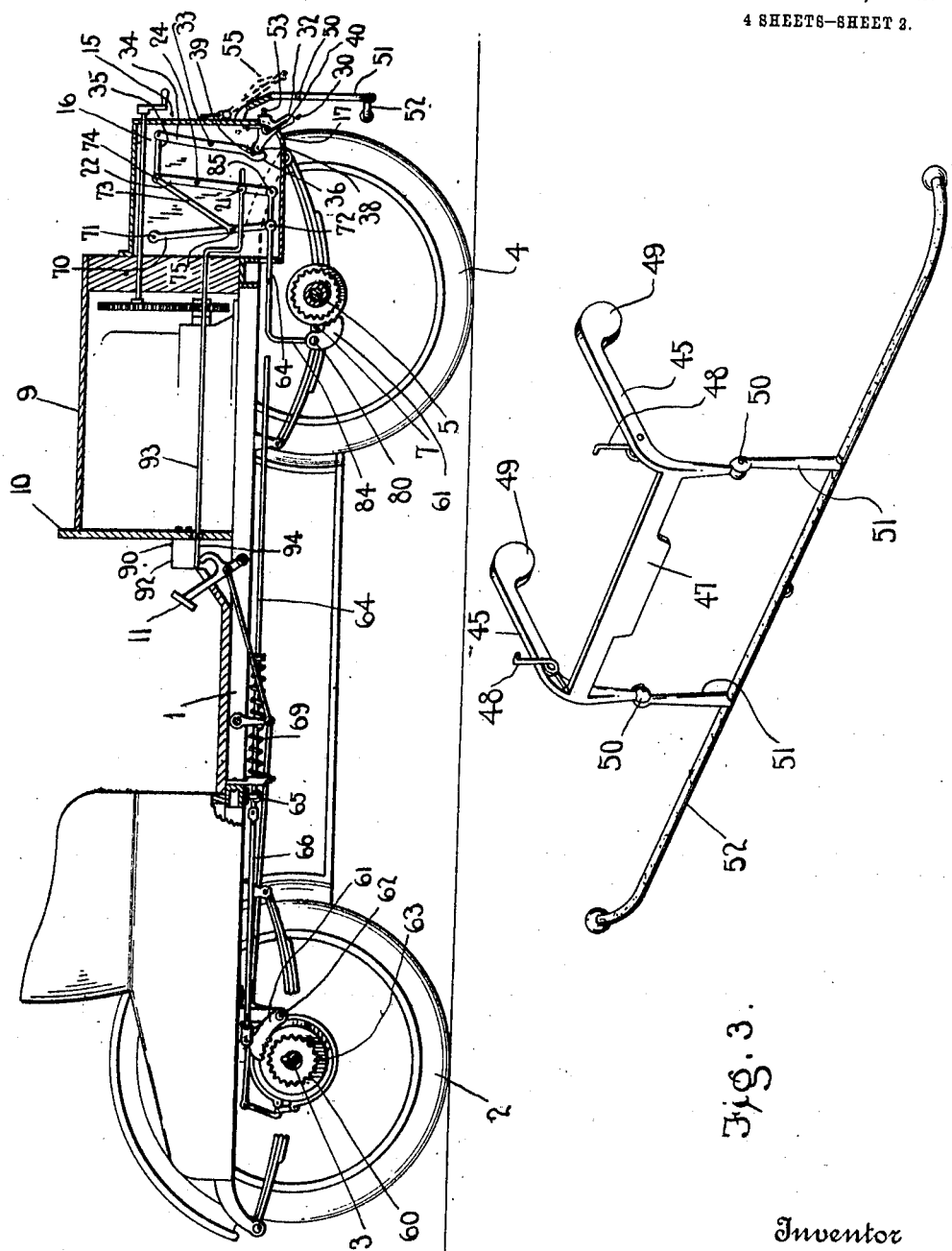

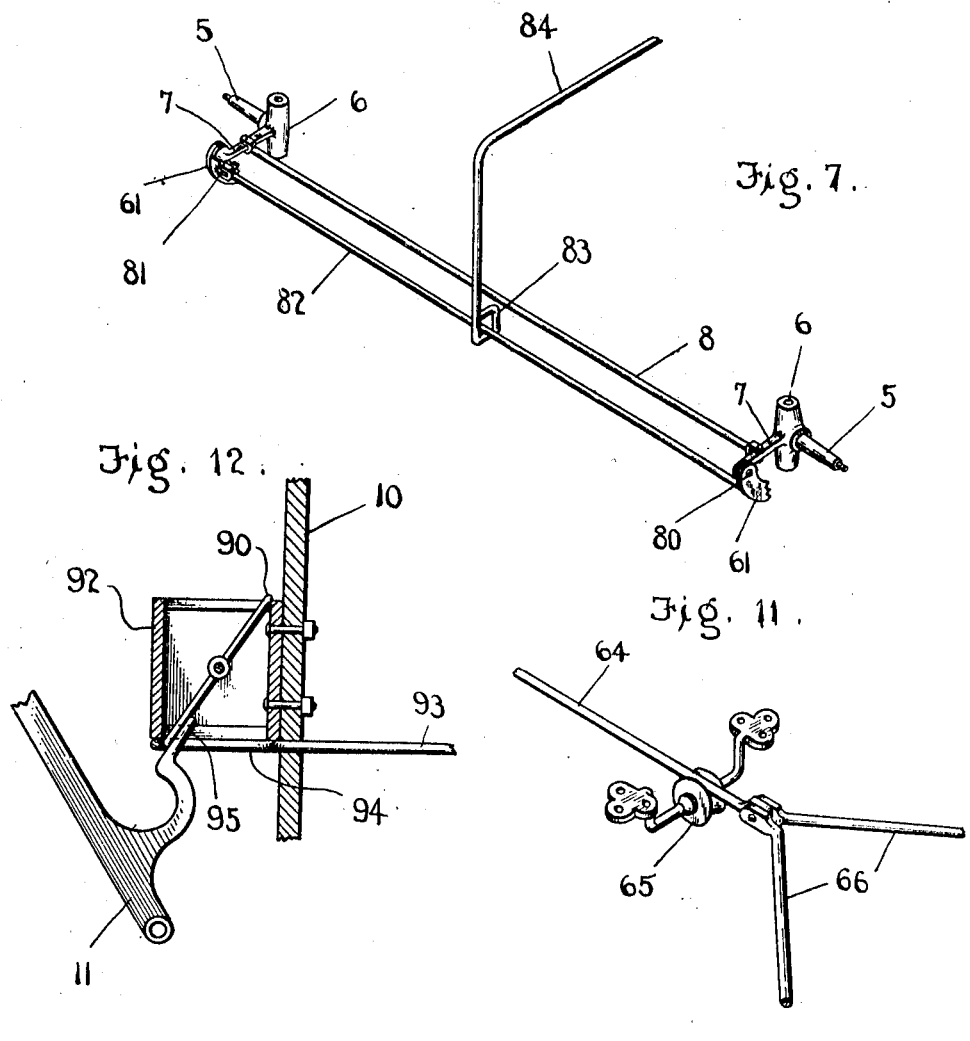

UNITED STATES PATENT OFFICE.

ANTHONY SHADLOFSKI, OF PLYMOUTH, PENNSYLVANIA.

AUTOMATIC MOTOR-VEHICLE BRAKE.

1,040,244.

Specification of Letters Patent.   Patented Oct. 1, 1912.

Application filed April 15, 1912. Serial No. 690,765.

*To all whom it may concern:*

Be it known that I, ANTHONY SHADLOFSKI, a citizen of the United States, residing at Plymouth, in the county of Luzerne and State of Pennsylvania, have invented certain new and useful Improvements in Automatic Motor-Vehicle Brakes; and I do declare the following to be a full, clear, and exact description of the invention, such as will enable others skilled in the art to which it appertains to make and use the same.

This invention relates to motor vehicles, and more especially to the brakes thereof; and the object of the same is to produce an attachment for automobiles and the like by means of which, when the machine is run into a pedestrian or other obstruction, the brake will be automatically applied or in the amplified form of my invention the wheels will be absolutely and immediately stalled against further rotation.

In carrying out this object I make use of several features, including the spring mechanism for automatically applying the brakes, the means for setting said mechanism by hand, the fender for tripping the setting mechanism, a signal adjacent the operator by which he is informed whether the brake mechanism has been set, and the specific connection between the brake actuating mechanism and the shoes on the hubs of wheels rotating on stub axles connected with the machine by means of knuckle joints. These various features are fully described and claimed below, and shown in the drawings wherein—

Figure 1 is a plan view of the invention complete, applied to an automobile; and Fig. 2 is a side elevation of the invention, similarly applied. Fig. 3 is an enlarged perspective detail of the fender. Fig. 4 is an enlarged side elevation of the setting lever, and Fig. 5 is a longitudinal section of the same lever, viewed from the other side, and a side elevation of the lower end of the cam lever. Fig. 6 is a front elevation of an automobile with my invention applied thereto, showing the fender as dropped ready for use. Fig. 7 is a perspective detail showing the means for applying the brakes to the front or steering wheel, and Fig. 8 is an enlarged elevation taken from the rear of one of said wheels with the brake-applying mechanism adjacent. Fig. 9 is a perspective view of the lower portion of the casing which is mounted forward of the automobile hood, showing the several compartments therein and some of the mechanism contained within the compartments. Fig. 10 is an enlarged perspective detail of one of the shoes. Fig. 11 is a similar perspective detail of the guide. Fig. 12 is an enlarged vertical section showing the signaling mechanism and the connection between the brake mechanism forming the subject matter of the present invention and the pedal of the ordinary brake mechanism usually found on an automobile.

The frame 1 of the automobile or other motor vehicle is supported by the usual rear wheels 2 mounted on the rear axle 3 and driven by means not necessary to illustrate or describe, and by front wheels 4 mounted on stub axles 5 connected with the front axle by knuckles 6 from which project arms 7 which are in turn pivotally connected by a cross rod 8 so that they shall move in unison as usual; and the steering mechanism is connected with one of the arms or with this cross rod in a manner not necessary to illustrate or describe. The frame carries the usual hood 9 and dashboard 10, and in rear of the latter and adjacent the driver's seat is the brake pedal 11 by means of which he can apply the brake by foot pressure in the usual manner. No novelty is claimed for the parts thus far described.

The actuating mechanism for the brakes hereinafter described is by preference located within a casing 15 which may be disposed forward of the hood 9 and essentially comprises a central lever compartment 16 with a slot 17 in its front end for a purpose to appear below, while it also preferably comprises two side compartments 18 in which are placed the springs if spring power be employed for applying the brakes. While this is my preferable source of energy and has been described and illustrated herein, it will be clear that much latitude may be allowed the manufacturer as to the kind of power he employs, especially as this casing containing the source of energy is adjacent the hood of the automobile containing its engine and from which latter power might easily be drawn and stored in a number of ways. As perhaps the simplest source of power, however, I have illustrated springs 19 in the compartments 18 coiled on guide rods 20 connected by a cross head 21 which passes through the lever compartment 16 wherein it is connected with or passes through the power lever 22 as at 23, and the tendency of these springs is to swing said lever in the direction of the arrow in Fig. 9 around its pivot 24; and the brake mechanism proper will be so connected with the opposite extremities of this lever that when it moves as thus indicated brake shoes will be applied to the drums of the several wheels.

The setting mechanism employed in conjunction with the power mechanism as described above comprises a bent lever 30 located within the slot 17 in the casing 15 and pivoted between its ends therein as at 31, while its protruding front end has a handle 32 which may be grasped and drawn upward by the operator. Pivoted at 33 within the lever compartment 16 is a cam lever 34 connected at its upper end with the upper end of the power lever 22 by a link 35, and having a cam face 36 at its lower end provided at a suitable point with a notch or keeper 37; and over said cam face moves the inner end of the setter lever 30 as its handle is raised, said inner end by preference carrying an anti-friction roller 38 so disposed that it will move over the cam face in the act of setting the device. The inner arm of the setter lever 30 also carries a spring-actuated latch 39 whose tip is adapted to be projected into the notch or keeper 37 when this lever has been turned so that the cam lever 34 has been forced to the rear at its lower end and the power lever 22 has been moved to put the springs 19 under tension; and finally a spring 40 is provided for turning the setting lever 30 in the opposite direction to free the cam lever 34, when the latch 39 is withdrawn from the keeper 37.

The fender used in connection with this invention comprises two L-shaped side bars 45 pivoted at 46 to the sides of the casing 15 or to other suitable points on the automobile and connected by a cross bar 47 which extends across the front of the same, and for throwing said cross bar upward and away from the setting device above described I may employ springs 48 coiled around the pivots 46, or weights 49, or both. The lower extremities of said side bars 45 are connected by knuckle joints 50 with short arms 51 rising from a transverse cushion bar 52 which travels at the extreme front end of the machine and forward of its wheels and to which I give this name because it will be made soft as by being covered with rubber. In conjunction with this fender a spring-actuated trigger 53 is mounted in the setting lever 30 and connected as at 54 with the latch 39, so that when the fender is borne to the rear it depresses the trigger, draws the tip of the latch 39 out of engagement with the keeper 37, and permits the spring 40 to trip the setting mechanism with the result described above. When the fender is not used, it may be folded upward around its knuckle joints 50 and hooked up as at 55. At all times the cushion bar 52 will be serviceable in preventing any of the parts at the front end of the automobile from being marred or broken by accident.

The brake mechanism proper comprises drums 60 on the hubs of the various wheels, and shoes 61 pivoted at 62 near the same, the contacting faces of the drums and shoes being by preference notched or serrated as shown at 63 so that when the brakes are applied the wheels will be absolutely stalled. If these serrations are omitted, the drums and shoes are made like those used in the ordinary brake mechanisms as applied to motor vehicles; but as this device is for emergencies when it will be necessary to stop the automobile abruptly, I prefer to use the serrated faces 63 so that the brake mechanism herein described is employed in addition to the ordinary brake mechanism with which a motor vehicle is equipped and which of course is actuated by the pedal 11 referred to above and in a manner not necessary to describe. The rod 64 which applies the brakes to the rear wheels extends beneath the frame 1, through a guide 65, is then branched as shown at 66, and its extremities connected at 67 with the shoes 61; and forward of the guide I preferably dispose a stop 68 on said rod against which bears a spring 69 whose tendency is to apply the brakes to the rear wheels and which therefore serves to assist the actuating mechanism described above. Obviously the guide 65 supports the weight of this rod and spring. The front end of the rod 64 must be connected with the upper end of the power lever 22, and the means I employ for making the connection consist preferably of a supplemental lever 70 pivoted at 71 within the casing 15 and its lower end connected at 72 with the rod 64, while a link 73 connects the upper end 74 of the power lever with a point 75 on the supplemental lever 70 some distance below its pivot 71 so that movement of the power lever in the direction indicated by the arrow will apply the brakes to the rear wheels. The emergency brakes on the front wheels must, however, be actuated by slightly different mechanism because said wheels are journaled on stub axles 5 which turn on their knuckles as the machine is steered. The same (and preferably serrated) drums 60 and shoes 61 are here employed, the shoes being pivoted at 80 to the arms 7 and themselves having inwardly projecting ears 81 pivotally connected by a brake beam 82 which stands adjacent the cross rod 8 and moves longitudinally from side to side of the machine as the latter is steered. Embracing the central portion of this beam 82 is an eye 83 at the rear end of the front brake rod 84, and the forward end of this rod is pivotally connected at 85 with the lower end of the power lever 22 so that when the latter is moved in the direction of the arrow the front brakes will be applied. I may here say that the invention could be simplified by omitting the emergency brakes on either the rear axle or the front axle, but it will be understood that this and other changes in details may be made without departing from the principle of my invention.

A signal is preferably employed in conjunction with this mechanism, so that the operator may be informed whether the automatic brake mechanism has been set; and the same consists of a finger 90 pivoted within and moving adjacent marks 91 on a box 92 carried by the dashboard 10 or other part of the machine where it will be within sight of the operator, and a rod 93 connecting this finger with the power lever 22. When the latter stands in one position with the actuating mechanism set, the finger 90 is at one extreme of its movement and the operator knows that by cranking or starting his machine he can progress without interference; but when the finger stands at the opposite extreme of its movement he is informed that the various shoes 61 are engaged with the several drums 60 and he cannot start the machine. In conjunction with this signal I preferably form a loop 94 on the rod 93 which loosely embraces a stud 95 on the pedal 11, the construction being such that when the actuating mechanism is tripped and the power lever 22 moved to apply the automatic brake, its draft on the rod 93 will cause the loop 94 to engage the stud 95 and move the brake pedal 11 so that the ordinary brakes on the automobile will also be applied. In fact, with this amplification the finger 90 and marks 91 within the box 92 might be omitted, as the operator would be informed by the position of the brake pedal 11 whether the automatic brakes were set or not. On the other hand, when they are set the loop 94 moves to the rear and frees the stud 95, so that the ordinary brakes may be manipulated at will as usual. When this automatic brake is set so that its shoes 61 are out of contact with the drums 60, the motor vehicle may be cranked and driven and started and stopped as usual. To set the same it is only necessary for the operator to grasp the handle 32 of the setting lever 30 and move it upward; this causes the roller 38 to move down the cam face of the lever 34 and swing the latter in such direction that its link 35 moves the power lever 22 and places the springs 19 under tension, the rods 64 and 84 meanwhile drawing the shoes out of engagement with the drums. As the handle 32 is raised to its extreme, the tip of the latch 39 drops into the notch 37 in the cam face 36, and the parts are held in this position so that the fender can be lowered and its cushion bar 52 stands forward of the wheels and all other parts of the machine. The presence of the casing 15 even in front of the hood 9 of the automobile puts this fender quite some distance ahead of the wheels, but this I consider of advantage because when an accident is imminent and a pedestrian, for instance, is struck by the cushion bar 52 and knocked down, the inertia of the motor vehicle will carry it some distance forward even though the automatic brakes act instantly and the rotation of all the wheels is checked so that the machine slides forward on its tires. However, under ordinary conditions the automobilist will usually have applied the emergency brakes by means of the pedal 11 and slowed his machine down considerably before he strikes the pedestrian, hoping and expecting that the latter will dodge aside at the last moment; and it will be found that if all hope fails and the cushion bar 52 strikes the pedestrian or other obstruction, the positive stalling of the wheels so that their tires slide upon the ground for the short distance intervening between said cushion bar and the point where the recumbent pedestrian would be struck by the automobile is sufficient for the latter to come to rest. The rearward movement of the fender causes its cross bar 47 to push inward on the trigger 53 which through its connection 54 with the latch 39 withdraws the latter from the notch or keeper 37, and permits the spring 40 to throw the setting lever 30 upward at its rear end and out of engagement with the cam face of the lever 34, and as soon as the latter is permitted to move it turns on its pivot 33 and that permits the power lever 22 to swing in the direction of the arrow under the impulse of the power mechanism such as the springs 19. Such action of the power lever 22 moves the rod 84 forward, swings the brake beams 82, and applies the shoes 61 to the drums 60 of the front wheels whatever the position of the latter, as the eye 83 at the rear end of the rod permits the brake beam 82 to slide through it as the machine is steered. Such movement of the power lever 22, through the link 73, also swings the supplemental lever 70, and this pushes the rod 64 to the rear against the tension of the supplemental spring 69, and its branch 66 swings the rear shoes 61 into contact with the rear drums 60. Moreover such movement of the power lever 22 draws on the rod 93 and sets the signal to indicate to the driver that the automatic brake has been applied, and if this rod 93 has the loop 94 engaging a stud 95 on the pedal 11, its forward movement moves said pedal and also applies the ordinary emergency brakes. So that, if an accident happens so suddenly that the operator has not even yet applied his foot brakes, by this amplification they are automatically applied through their connection with the automatic mechanism. If this connection is used it is possible to omit the serrations 63 on all faces of the brake shoes and drums, because the application of the brakes at eight points on the machine will doubtless stall its wheels in any event, or retard their rotation to such extent that the machine will stop within its length.

Thus it will be seen that I have produced an automatic brake for motor vehicles whose actuating mechanism may be spring power or any other source of energy taken from the engine, which when once set needs no further attention and interferes in no way with the ordinary running of the machine and its stopping and starting, and which is automatically tripped when the fender comes in contact with a pedestrian or other obstruction. Its equipment adds but little weight to the motor vehicle, and is an advantage to the machine and its driver and a safeguard for the general public.

As above suggested, it may not be necessary to employ all the details and amplifications hereinbefore set forth, and changes in unimportant particulars may be made without departing from the spirit of my invention.

What is claimed as new is:

1. In an automatic brake, the combination with the brake shoes, and rods leading therefrom; of a spring-actuated power lever connected with said rods, a cam lever connected with the power lever and having a notch in its cam face, a spring-actuated setting lever having a roller at one end adapted to engage said face and a handle at the other end, a latch carried by the lever and adapted to engage said notch, a spring for turning this lever to disengage it from the cam face when the latch is disengaged from the notch, and a pivoted fender adapted when pressed to the rear to retract said latch, for the purpose set forth.

2. In an automatic brake for automobiles and the like, the combination with a casing disposed forward of the hood and comprising three compartments, a power lever located in the central compartment, the brake shoes, and connections between said lever and shoes; of power mechanisms located in the side compartments, a cross head connecting said mechanisms and intermediately connected with said lever, means for setting the latter, and means for automatically tripping the setting mechanism when an accident occurs.

3. In an automatic brake for automobiles and the like, the combination with a casing disposed forward of the hood and comprising three compartments, a power lever located in the central compartment, the brake shoes, and connections between said lever and shoes; of springs mounted on guide rods in the side compartments, a cross head connecting them and intermediately connected with said power lever, a cam connected with the latter, a setting lever adapted to be manually turned into contact with said cam, and means for tripping the setting lever when an accident occurs.

4. The combination with a motor vehicle, a stud on its brake pedal and a signal adjacent said pedal and including a pivoted finger; of automatic brake mechanism additional to the emergency brake mechanism on the motor vehicle, actuating mechanism for applying the automatic brake, a rod leading from said actuating mechanism to the brake pedal and having a loop loosely embracing its stud and also embracing said finger, means for setting said actuating mechanism, and means for tripping the setting means when an accident occurs.

5. In an automobile, the combination with the front axle, knuckles thereon, stub shafts on the knuckles, the front wheels having drums on their hubs, arms projecting from said knuckles, a cross bar pivotally connecting the arms, brake shoes pivoted to said arms and connected by a brake rod, and a rod having an eye sliding loosely on the brake rod; of a fender comprising two L-shaped side bars pivoted at their angles to the automobile and having their pendant arms connected by a cross bar, a cushion bar having arms rising therefrom, knuckle joints connecting these arms with said pendant arms of the side bars, means for turning the fender on its pivots to move the cushion bar normally forward, and automatic brake-applying mechanism tripped by the movement of the fender to the rear, for the purpose set forth.

In testimony whereof I have hereunto set my hand in presence of two subscribing witnesses.

ANTHONY SHADLOFSKI.

Witnesses:
CHARLES E. SMITH,
WILLIAM W. SPRY.